United States Patent [19]

Canziani

[11] Patent Number: 4,726,464
[45] Date of Patent: Feb. 23, 1988

[54] CARRIAGE WITH TILTABLE PLATES, FOR SORTING MACHINES IN PARTICULAR

[76] Inventor: Francesco Canziani, Via Contardo Ferrini 21-21010, San Macario (VA), Italy

[21] Appl. No.: 733,626

[22] Filed: May 13, 1985

[30] Foreign Application Priority Data

Jan. 29, 1985 [IT] Italy ............................ 20636/85[U]

[51] Int. Cl.⁴ ............................................ B65G 47/38
[52] U.S. Cl. .................................... 198/365; 104/139; 105/30
[58] Field of Search ...................... 198/365, 802, 861.3, 198/861.5, 370; 104/139, 140; 105/30, 49, 26 L; 191/23 R, 23 A, 45 A, 22 C

[56] References Cited

U.S. PATENT DOCUMENTS

| 2,649,835 | 8/1953 | Lierly ............................... 191/23 R |
| 3,391,652 | 7/1968 | Lauber . |
| 3,727,560 | 4/1973 | Blemly, et al. . |
| 3,848,728 | 11/1974 | Leibrick et al. ...................... 198/365 |
| 3,912,071 | 10/1975 | Nielson ................................ 198/365 |
| 4,044,688 | 8/1977 | Kita ...................................... 105/30 |
| 4,089,404 | 5/1978 | Venzke ............................... 198/365 |
| 4,174,773 | 11/1979 | Venzke ............................... 198/365 |
| 4,304,187 | 12/1981 | Becker et al. ..................... 105/141 X |
| 4,399,904 | 8/1983 | Canziani . |
| 4,532,385 | 7/1985 | Friske ................................ 191/23 A |

FOREIGN PATENT DOCUMENTS

| 2014933 | 9/1979 | United Kingdom . |
| 2110448 | 6/1983 | United Kingdom . |
| 2113633 | 8/1983 | United Kingdom . |
| 2141680 | 1/1985 | United Kingdom . |

Primary Examiner—Robert J. Spar
Assistant Examiner—Lyle K. Kimms
Attorney, Agent, or Firm—Ladas & Parry

[57] ABSTRACT

A carriage of the tiltable plate kind for a sorting apparatus has a carrying structure having idle wheels for running in a feed direction along rails on one side of the carrying structure and a pair of spaced uprights projecting from the opposite side of the carrying structure. A frame is hingedly linked to the one side of the carrying structure, the frame having pairs of wheels for engaging opposite sides of a fixed rail. A motor drives at least one wheel of the pairs of wheels of the frame for self-driving the carrying structure. A plate is hinged to end portions of the uprights for rotation about an axis substantially parallel to the feed direction of the carrying structure. A rotatable threaded shaft is between the uprights in the feed direction of the carrying structure. A guide is along the carrying structure in the feed direction thereof and a cursor is on the guide and engaging the threaded shaft for movement along the guide in the feed direction of the carrying structure by rotation of the threaded shaft. A pair of cams is on the plate on opposite sides of the threaded shaft transversely of the feed direction for engaging the cursor, the cams having symmetrically equal contours for tilting the plate in either direction upon rotation of the threaded shaft and movement of the cursor.

1 Claim, 3 Drawing Figures

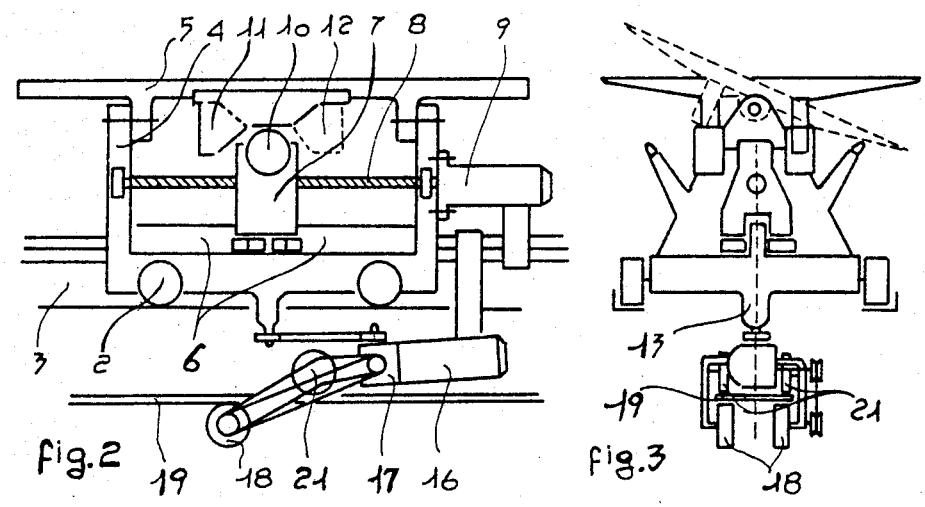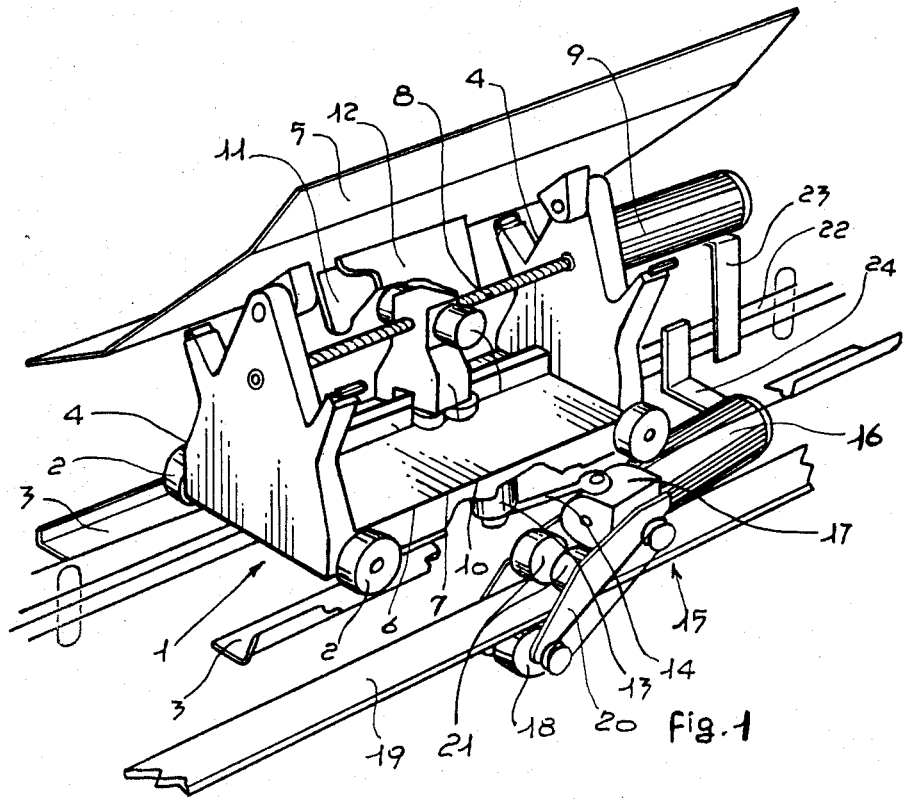

CARRIAGE WITH TILTABLE PLATES, FOR SORTING MACHINES IN PARTICULAR

The invention provides a carriage with a tiltable plate for a sorting machine, there being independent means for running the carriage and tilting the plate. More particularly, the carriage according to the invention is moved independently along a path made up of rails by an independent motor driving wheels which run along one of the rails. The means that make the plate tilt move along with the carriage and are fed by sliding contacts from feed rods placed along the path.

Selection and sorting plants are known. They have a plurality of conveyor planes, which are dragged along a fixed path and, on which are laid items to be discharged in predetermined collecting stations.

In some cases the discharge is effected by pusher elements that run along the conveyor plane. In other cases, the conveyor plane consists of a tiltable plate which, upon inclining, discharges the object at either side of the path.

According to the prior art, the tilting of the plate is generally operated by a plurality of cams set along the path and suitably adjusted to interact with lever systems or similar devices connected with the plate.

These substantially mechanical devices thereof have the usual drawbacks such as noisiness, high inertia, frictions and, consequently, wear, and need for the whole apparatus to be frequently checked and maintained.

To obviate the above deficiencies, the present invention provides a carriage of the tiltable plate kind with independent dragging means, and independent means for making the plate tilt.

This allows more proper sizing of the plant's carrying structures, and compact and light apparatus for more limited maintenance.

The present invention will be now described in detail, with special reference to the attached drawings, in which:

FIG. 1 is a perspective view of a carriage according to the invention;

FIG. 2 is a side view of a carriage according to the invention;

FIG. 3 is a front view of a carriage according to the invention.

The carriage according to the invention comprises a carrying structure 1 equipped with idle wheels 2 that run along rails or fixed guides 3. Structure 1 has, at its ends, a pair of uprights 4, at the upper end of which is hinged a plate 5 that may rotate around an axis substantially parallel to the direction of feed of the carriage. A cursor 7 runs along a guide 6 inside uprights 4; said cursor is set in motion when a threaded shaft 8 or the like is given a rotatory motion by a motor 9 of the direct current permanent magnet kind.

At the sides of cursor 7 there is a pair of idle wheels 10 which, as the cursor shifts, act upon two cams 11 and 12 fixed below plate 5, at opposite sides with respect to the axis of rotation of said plate.

The cams 11 and 12 have symmetrically equal contours, that is as the height of one cam decreases, the height of the other increases to the same extent. Accordingly, the cursor 7, upon shifting backwards and forwards along guide 6, will act alternatively on either cam to make the plate 5 tilt to either side.

The contour of the cams is better illustrated in FIG. 2, where cam 11 is indicated by a continuous stroke, and cam 12 by a dashed line.

To guide 6 there are also applied some micro-switches (not shown as being of known type) connected with electronic apparatuses which control the sorting machine.

Lower down frame 1 of the carriage there is a joint 13 to which is linked a rod 14, hinged in turn at motor means indicated as a whole by No. 15, comprising a motor 16 of the direct current permanent magnet kind too; said motor acts, by means of a reducer 17 or the like, upon one or more driving wheels 18 running too along a fixed rail 19.

The driving wheels 18 are mounted at the end of a frame 20 comprising also idle wheels 21, set opposite the rail in respect of the driving wheels 18. The motor 16 is mounted on frame 20, so that its own weight creates a torque that keeps the driving wheels constantly pressed against rail 19, apart from any wear of the driving wheels themselves.

Both motor 9 and motor 16 are fed electricity from fixed feed rods 22 set along the path, the electricity being conducted to the carriage by sliding contacts 23 and 24.

The working takes place as follows: after an item to be sorted has been placed on plate 5, a central unit not shown, which controls all the functions of the sorting apparatus of which the described carriage is part, sends current to the feed rods 22 and from here through the sliding contact 24, to motor 16 which is started and drags the carriage along the rails 3.

The weight of the motor 16 keeps the driving wheels 18 constantly pressed against rail 19.

When the carriage passes before a predetermined discharge station, the central unit sends voltage to the feed rods 22 placed at said discharge zone, the voltage being drawn by contacts 23 and sent to motor 9.

In accordance with the polarity, which is established each time by the central control unit, the motor rotates the threaded shaft 8 in either ways, making thus cursor 7 shift parallel to the direction of feed of the carriage or in the opposite direction.

During this movement the idle wheels 10 act on cams 11 and 12 causing thus plate 5 to tilt at either sides to effect the discharge.

During this step the micro-switches placed along guide 6 send suitable signals to the control unit, which can check if the system works regularly.

As already said, the provision for independent actuating means that shift along with the carriage allows a more rational design of the whole sorting apparatus and a greater flexibility of the plant which, once several movable parts have been eliminated, may be easily adapted to the varied requirements of use.

Furthermore, the use of direct current permanent magnet motors—which offer remarkable acceleration and deceleration characteristics—makes it possible to control with extreme care the magnitude of the rotation made by the carriage.

In addition, thanks to the compact apparatuses being used, and the particular shaping of the different components, it is possible to better protect the machine against powder or other foreign bodies which could considerably increase the wear of the movable components.

The apparatus according to the invention requires therefore reduced maintenance operations due to the absence of mechanical devices for the tilting of the plate, allows higher working speeds without the risk of damages or wear and is finally much more silent than other known analogous systems. Obviously the sizes, as well as the employed materials, may vary according to the different requirements of use.

I claim:

1. A carriage of the tiltable plate kind for a sorting apparatus, the carriage comprising:

a carrying structure having idle wheels for running in a feed direction along rails and a pair of spaced uprights projecting from the opposite ends of the carrying structure;

drive means comprising a frame hingedly linked to the one side of the carrying structure, the frame having pairs of wheels for engaging opposite sides of a fixed rail, a motor for driving at least one wheel of the pairs of wheels of the frame, and means for running the motor, the drive means having for selfdriving the carrying structure;

a plate hinged to end portions of the uprights for rotation about an axis substantially parallel to the feed direction of the carrying structure;

a rotatable threaded shaft between the uprights in the feed direction of the carrying structure;

a guide along the carrying structure in the feed direction thereof and a cursor on the guide and engaging the threaded shaft for movement along the guide in the feed direction of the carrying structure by rotation of the threaded shaft;

a pair of cams on the plate on opposite sides of the threaded shaft transversely of the feed direction for engaging the cursor, the cams having symmetrically equal contours, whereby, as the height of one cam from the plate decreases, the height of the other increases to the same extent;

a direct current permanent magnet motor on the carrying structure for reversibly rotating the threaded shaft, whereby, as rotation of the threaded shaft moves the cursor backward and forward along the guide in the feed direction the cursor acts alternatively on either cam to make the plate tilt to either side; and means for reversibly running the direct current permanent magnet motor independently of the other motor.

* * * * *